:::
United States Patent
Sultan et al.

(10) Patent No.: US 7,810,444 B2
(45) Date of Patent: Oct. 12, 2010

(54) CONFIGURABLE GAUGE APPARATUS INCLUDING A FLAT PANEL DISPLAY AND A MECHANICAL POINTER

(75) Inventors: Michel F. Sultan, Troy, MI (US); David K. Lambert, Sterling Heights, MI (US)

(73) Assignee: Delphi Technologies, Inc., Troy, MI (US)

( * ) Notice: Subject to any disclaimer, the term of this patent is extended or adjusted under 35 U.S.C. 154(b) by 112 days.

(21) Appl. No.: 12/229,939

(22) Filed: Aug. 28, 2008

(65) Prior Publication Data

US 2010/0050927 A1   Mar. 4, 2010

(51) Int. Cl.
*G01D 11/28* (2006.01)
*G01D 13/22* (2006.01)

(52) U.S. Cl. .............. 116/288; 116/286; 116/328; 116/DIG. 36; 362/29

(58) Field of Classification Search ......... 116/284–289, 116/291, 305, 327, 328, 331, 332, 334, 335, 116/62.1, 62.3, 62.4, DIG. 5, DIG. 6, DIG. 36; 362/23, 26–30
See application file for complete search history.

(56) References Cited

U.S. PATENT DOCUMENTS

| | | | |
|---|---|---|---|
| 3,992,655 A | | 11/1976 | Olson et al. |
| 4,252,078 A | * | 2/1981 | Fukasawa et al. .......... 116/288 |
| 4,968,930 A | * | 11/1990 | Grupp et al. ............... 324/115 |
| 6,490,992 B2 | * | 12/2002 | Olbrich et al. ............. 116/288 |
| 6,827,034 B1 | * | 12/2004 | Paulo .......................... 116/286 |
| 7,159,534 B2 | | 1/2007 | Tanaka et al. |

2007/0090939 A1   4/2007   Takato

FOREIGN PATENT DOCUMENTS

| | | | |
|---|---|---|---|
| DE | 195 37 666 | | 4/1997 |
| DE | 19537666 A1 | * | 4/1997 |
| DE | 100 46 237 | | 4/2002 |
| DE | 10046237 A1 | * | 4/2002 |
| DE | 10153102 A1 | * | 5/2003 |
| DE | 10 2006 047896 | | 4/2008 |
| FR | 2 729 345 | | 7/1996 |
| FR | 2 770 643 | | 5/1999 |
| JP | 08 327410 | | 12/1996 |
| JP | 11 118537 | | 4/1999 |
| JP | 2003161650 A | * | 6/2003 |

OTHER PUBLICATIONS

European Search Report dated Dec. 17, 2009.
European Search Report dated Feb. 24, 2010.

* cited by examiner

*Primary Examiner*—Amy Cohen Johnson
(74) *Attorney, Agent, or Firm*—Jimmy L. Funke

(57) ABSTRACT

A configurable gauge apparatus includes a flat panel display (FPD) for displaying a user-defined gauge face, a transparent panel spaced from the FPD through which the displayed gauge face is viewed, and a mechanical pointer disposed between the FPD and the transparent panel for indicating a current value of a parameter of interest. The pointer includes a stem and a hub that rotatably supports the stem, and the hub is mounted on the FPD or the transparent panel. Pointer position is regulated either magnetically with a pointer magnet and a magnetic field generator disposed behind the FPD, or electrically with a motorized hub activated with transparent conductors formed on the FPD or transparent panel. The stem of the pointer is illuminated by either the FPD, or a hub-mounted LED activated with transparent conductors. Transparent conductors are also used to form a sensor array for detecting pointer position.

4 Claims, 4 Drawing Sheets

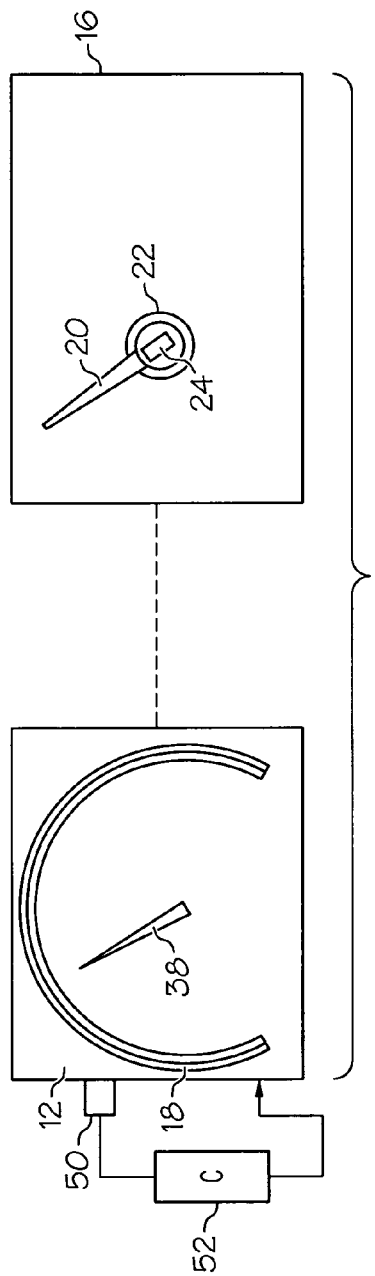
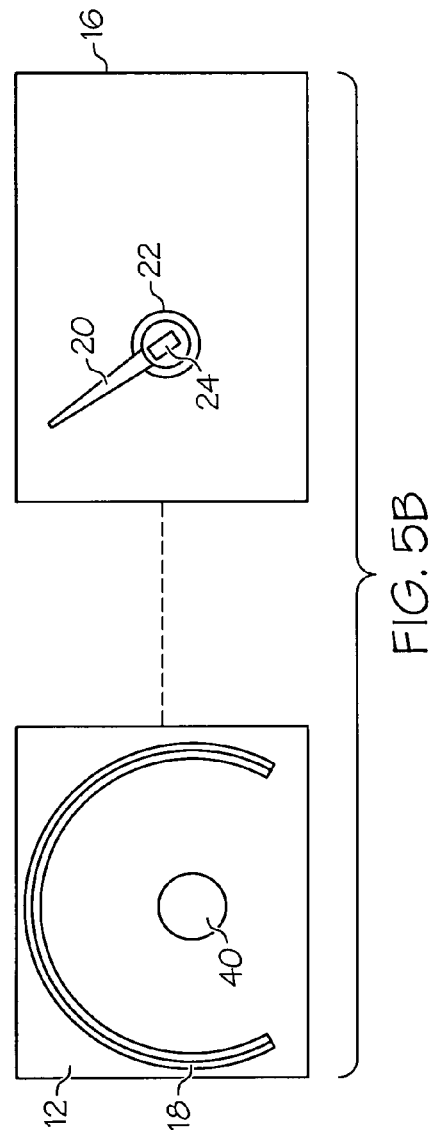

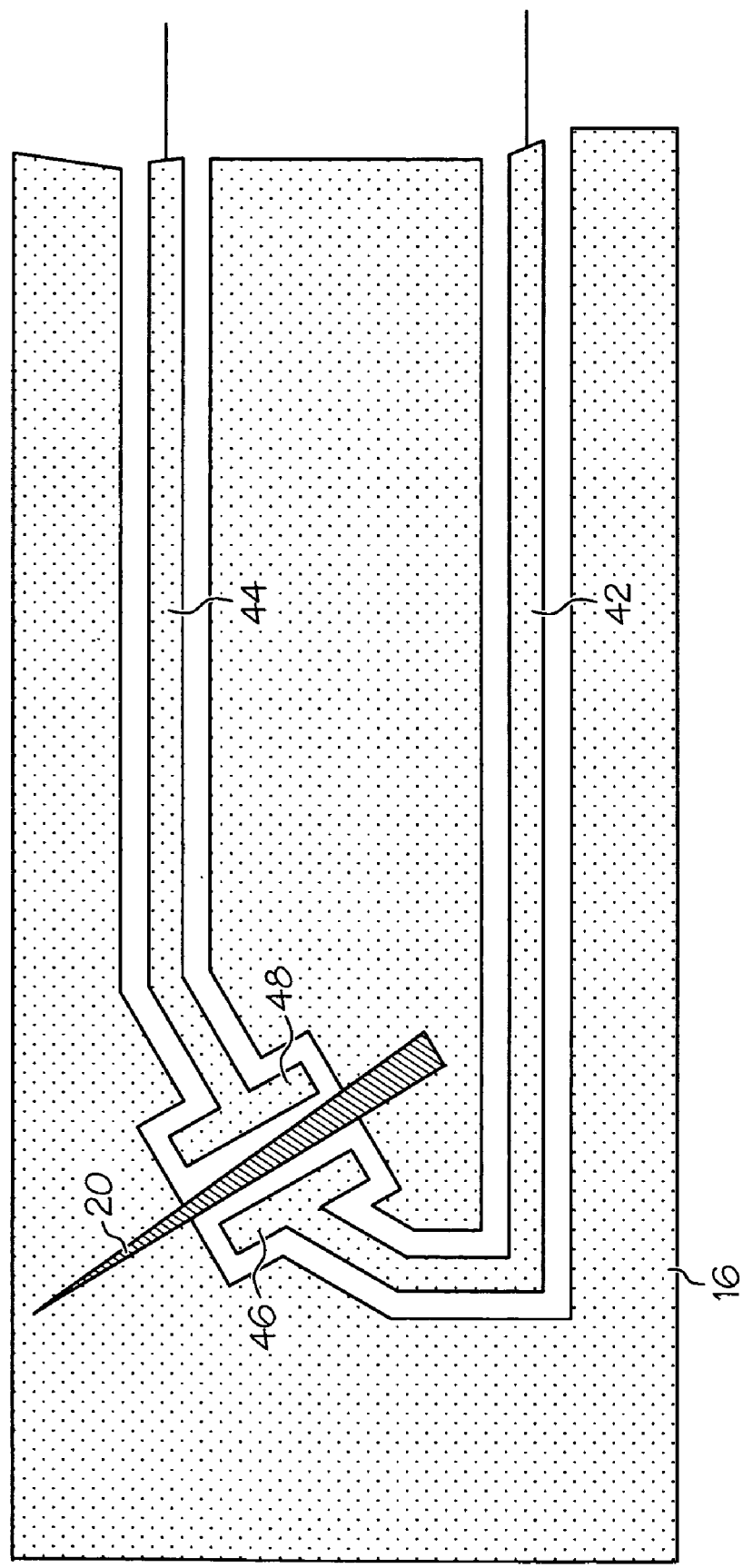

US 7,810,444 B2

CONFIGURABLE GAUGE APPARATUS INCLUDING A FLAT PANEL DISPLAY AND A MECHANICAL POINTER

TECHNICAL FIELD

The present invention relates to instrumentation gauges in which a re-configurable flat panel display is used to display a user-defined gauge face representing a parameter of interest, and a rotary mechanical pointer disposed between the flat panel display and the user registers with indicia of the displayed gauge face to indicate a current value of the parameter.

BACKGROUND OF THE INVENTION

Reconfigurable flat panel displays have been used in automotive instrument clusters to electronically portray indicia, alphanumeric characters and legends customarily provided in printed or painted gauge faces. The advantages of the electronic approach include user-definability in terms of color and layout, and the ability to display different parameters or information in a single gauge-space. Although the current value of a parameter can be indicated in different ways, many people prefer displays that include a mechanical pointer or needle, even though the flat panel display can be used to electronically portray a pointer. However, providing a mechanical pointer in front of a flat panel display is non-trivial because it is impractical to drill a hole in the display to accommodate the pointer shaft.

SUMMARY OF THE INVENTION

The present invention is directed to an improved gauge apparatus including a re-configurable flat panel display electrically activated to display a user-defined gauge face, including arcuately arranged indicia corresponding to a parameter of interest, a transparent panel spaced from the flat panel display through which the displayed gauge face is viewed, and a mechanical pointer disposed between the flat panel display and the transparent panel for indicating a current value of the parameter. The pointer includes a stem and a hub that rotatably supports the stem, and the hub is mounted on a surface of the flat panel display or a surface of the transparent panel. Rotation of the stem with respect to the hub is regulated either magnetically with a magnetic field generator disposed behind the flat panel display, or electrically with a motorized hub activated with transparent conductors formed on the flat panel display or transparent panel. The stem of the pointer is illuminated by either the flat panel display, or a hub-mounted LED activated with transparent conductors. Transparent conductors are also used to form a sensor array for detecting a position of the pointer and calibrating the gauge.

BRIEF DESCRIPTION OF THE DRAWINGS

FIG. 5A depicts an embodiment of the gauge of FIG. 1 in which a stem of the pointer is illuminated by an image generated by flat panel display in visual alignment with the stem;

FIG. 5B depicts an embodiment of the gauge of FIG. 1 in which a stem of the pointer is illuminated by light emitted from a region of the flat panel display in visual alignment with the pointer hub; and FIG. 6 depicts an embodiment of the gauge of FIG. 1 in which a capacitive sensor defined by an array of transparent conductors formed on the flat panel display or the transparent panel senses a position of the pointer.

DESCRIPTION OF THE PREFERRED EMBODIMENT

Figure 1:
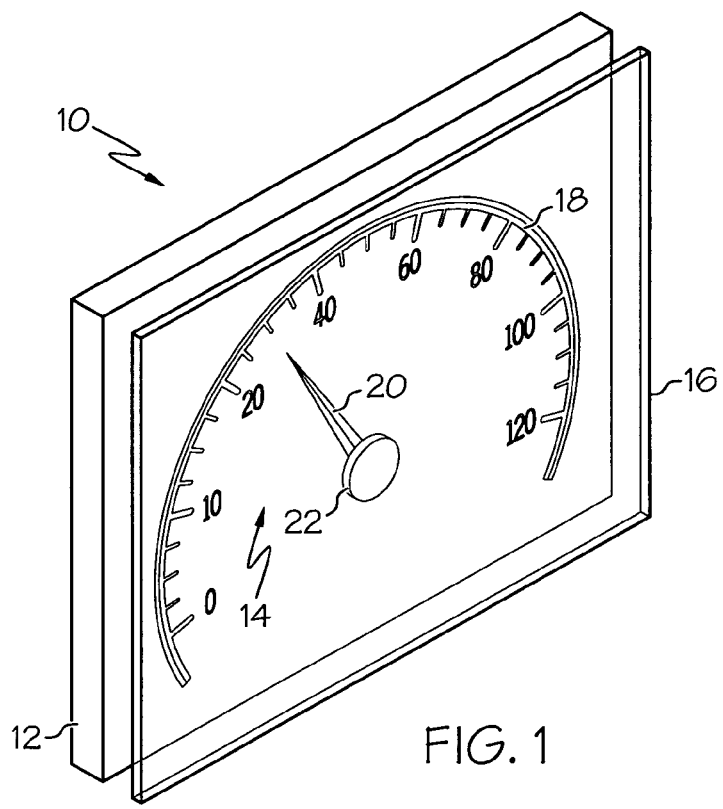
FIG. 1 depicts a gauge according to this invention, including a flat panel display, a transparent panel, and a mechanical pointer including a hub affixed to an inboard face of the flat panel display or the transparent panel.
Figure 2:
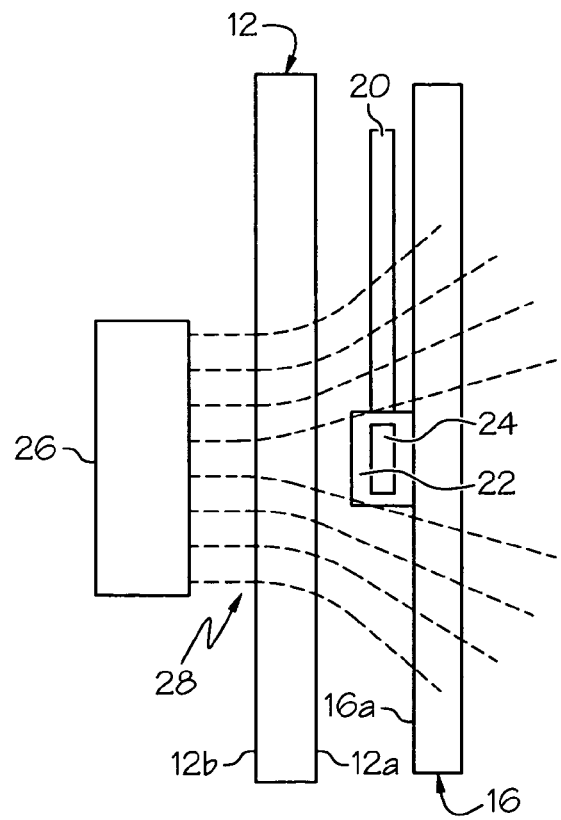
FIG. 2 depicts an embodiment of the gauge of FIG. 1 in which a permanent magnet is integrated into the pointer, and a magnetic field generator is disposed behind the flat panel display.
Figure 3:
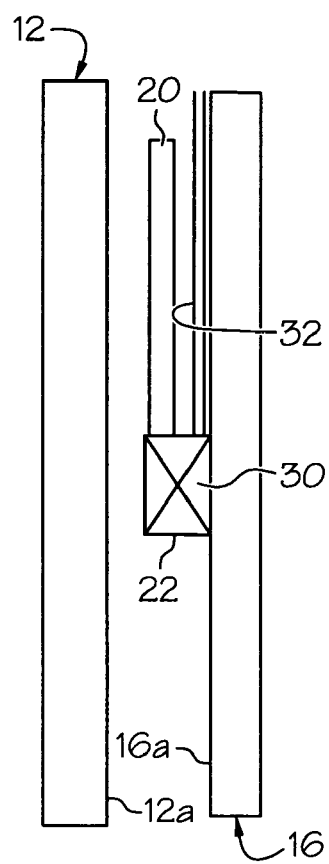
FIG. 3 depicts an embodiment of the gauge of FIG. 1 in which an electric motor is integrated into the pointer, and the motor is activated by transparent conductors formed on the flat panel display or the transparent panel.

Referring to FIG. 1, the reference numeral 10 generally designates a configurable gauge according to this invention, including a flat panel display 12, a mechanical pointer 14, and a transparent panel 16. The flat panel display 12 is viewed through the transparent panel 16, and the pointer 14 is disposed between the flat panel display 12 and the transparent panel 16. The flat panel display 12 may be a color LCD for example, and is activated to portray traditional gauge face indicia and characters as shown, including arcuately arranged indicia 18 corresponding to a parameter of interest, along with various numeric and/or alphanumeric legends. The pointer 14 includes a stem or needle 20 and a hub 22 that rotatably supports the stem 20. The pointer hub 22 is affixed (with an adhesive material, for example) either to the inboard face 16a of transparent panel 16 as shown, or to the inboard face 12a of flat panel display 12. FIGS. 2-3 depict alternate ways of producing rotary motion of the stem 20 with respect to hub 22, and FIGS. 4 and 5A-5B depict alternate ways of illuminating the stem 20.

FIG. 2 depicts an embodiment in which rotation of the pointer stem 20 is controlled by magnetic effects. A permanent magnet 24 is integrated into stem 20 or the rotary portion of hub 22, and a magnetic field generator 26 is disposed behind the flat panel display 12 in substantial alignment with the permanent magnet 24. Electrically, magnetic field generator 26 may comprise a set of mutually orthogonal coils or inductor components that are individually and variably excited to produce a magnetic field 28 that extends through the flat panel display 12 and interacts with the magnetic field of permanent magnet 24. The rotational orientation of the magnetic field 28 varies depending on how the magnetic field generator 26 is activated, and the permanent magnet 24 aligns with the magnetic field 28 to correspondingly position the pointer stem 20. Mechanically, magnetic field generator 26 may be mounted on a circuit board (not shown) or may be affixed directly to the outboard face 12b of flat panel display 12.

FIG. 3 depicts an embodiment in which rotation of the pointer stem 20 is controlled with a micro-stepper motor 30 that is integrated into the pointer hub 22. That is, the stator of motor 30 is fixed to the stationary portion of hub 22, and the armature of motor 30 is fixed to the rotary portion of hub 22 (and hence, the stem 20). The windings of motor 30 are energized by a remotely disposed controller (not shown) to position the stem 20 via a set of transparent conductors 32 formed on the mounting surface of hub 22 (i.e., on the inboard face 16a of transparent panel 16 or the inboard face 12a of flat panel display 12). The transparent conductors 32 may be formed, for example, of Indium Tin Oxide (ITO).

Figure 4:
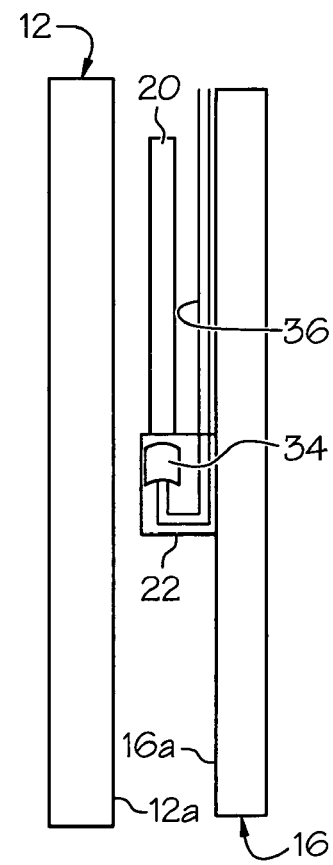
FIG. 4 depicts an embodiment of the gauge of FIG. 1 in which a LED is integrated into a hub of the pointer, and is activated by transparent conductors to illuminate a stem of the pointer.

FIG. 4 depicts an embodiment in which the stem 20 of pointer 14 is selectively illuminated by a LED 34 integrated into the pointer hub 22. Power is supplied to the LED 34 by a set of transparent conductors 36 formed on the mounting surface of hub 22 (i.e., on the inboard face 16a of transparent panel 16 or the inboard face 12a of flat panel display 12). As with the conductors 32 of FIG. 3, the transparent conductors 36 may be formed, for example, of Indium Tin Oxide (ITO).

FIGS. 5A-5B depict various embodiments in which the stem 20 of pointer 14 is selectively illuminated by light emitted from the flat panel display 12. In each case, the assembly is depicted in partial exploded view to show the illumination pattern of the flat panel display 12.

In the embodiment of FIG. 5A, the flat panel display 12 is activated to produce an image 38 of pointer stem 20, and the image 38 rotates with pointer movement so that it is always in visual alignment with the stem 20. The stem 20 in this case may be an acrylic segment that contains fluorescent particles that fluoresce when excited by the light produced by the aligned image 38. Advantageously, a photo-sensor 50 responsive to light of the fluorescing wavelengths may be installed at the edge of the display 12 to indicate the degree of coupling between image 38 and the stem 20. The photo-sensor 50 provides an output signal to a display controller 52, which controls the display 12 to position the image 38 based on the indicated degree of coupling so as to maintain proper alignment of the image 38 and stem 20. Also, the stem 20 may contain a mixture of different fluorescent particles so that the perceived color of stem 20 is changed by changing the wavelength (i.e., color) of the image 38. Alternately, the pointer stem 20 may be formed of a translucent frosted material so that the light produced by the aligned image 38 enters and diffuses through the stem 20. In that case, the pointer stem 20 simply takes on the color of the displayed image 38, and the pointer position must be accurately determined to ensure that the image 38 retains in visual alignment with the pointer stem 20. FIG. 6 illustrates one way to sense pointer position electrically, but in general, accurate knowledge of the pointer position may be sensed using various electrical, magnetic and mechanical sensing techniques.

The embodiment of FIG. 5B differs from the embodiment of FIG. 5A in that the pointer illumination occurs due to light emitted by a circular region 40 of flat panel display 12 that is visually aligned with the pointer hub 22. In this case, the region 40 is the same for any pointer position. The hub 22 collects the emitted light and directs it down the pointer stem 20 similar to the embodiment of FIG. 4 where the LED 34 is integrated into the pointer hub 22.

FIG. 6 illustrates a capacitive pointer position sensor defined by a pattern of transparent conductors 42, 44 formed on the inboard surface 12a of flat panel display 12 or the inboard surface 16a of transparent panel 16. The conductors 42 and 44 define first and second capacitive plates 46 and 48, respectively, and the position of the pointer stem 20 with respect to the plates 46 and 48 determines the capacitance between the conductors 42 and 44. Of course, more than one set of capacitive plates can be formed in this manner to provide redundancy and improved sensitivity. This type of sensing arrangement may be used to drive the pointer 14 to a specified position such a "zero" position, or to ensure that the pointer stem 20 (and the image 38, if applicable) are properly positioned by developing an error signal according to the deviation of the sensed position of stem 20 from the commanded position, and adjusting the pointer position to drive the error signal to zero.

In summary, the gauge apparatus of the present invention provides an inexpensive and practical way of integrating a flat panel display with a mechanical pointer. While the present invention has been described with respect to the illustrated embodiments, it is recognized that numerous modifications and variations in addition to those mentioned herein will occur to those skilled in the art. For example, the flat panel display 12 can be used to depict information in addition to the gauge face indicia 18, including other indicia, alphanumeric data, graphic images, and so forth. Accordingly, it is intended that the invention not be limited to the disclosed embodiment, but that it have the full scope permitted by the language of the following claims.

The invention claimed is:

1. A configurable gauge for indicating a current value of a parameter of interest, comprising:
    a re-configurable light-emitting flat panel display electrically activated to display a user-defined gauge face, including arcuately arranged indicia corresponding to said parameter;
    a transparent panel spaced from the flat panel display through which the gauge face is viewed;
    a mechanical pointer disposed between the flat panel display and the transparent panel, the mechanical pointer including a hub mounted on a surface of the flat panel display or a surface of the transparent panel, and a stem rotatably supported by the hub, the stem having a variable rotary position with respect to the gauge face to indicate the current value of the parameter of interest; and
    a display controller for activating the flat panel display to produce an image of said stem that is positioned in visual alignment with said stem regardless of the rotary position of said stem so that light emitted from said image illuminates said stem.

2. The configurable gauge of claim 1, where:
    the stem of said pointer includes fluorescent particles that fluoresce when excited by the light emitted from said image;
    a photo-sensor disposed at an edge of said display senses fluorescence of said fluorescent particles to indicate a degree of coupling between said image and said stem; and
    the display controller is responsive to said photo-sensor for adjusting a rotary position of said image so as to maintain the visual alignment of said image with said stem.

3. The configurable gauge of claim 1, where:
    the stem of said pointer is formed of a frosted translucent material; and
    the light emitted from said image diffuses through the frosted translucent material of said stem.

4. The configurable gauge of claim 3, where:
    said display controller activates said flat panel display to control a color of the light emitted from said image that diffuses through the frosted translucent material of said stem.

* * * * *